United States Patent
Zhao (10) Patent No.: US 8,948,269 B1
(45) Date of Patent: Feb. 3, 2015

(54) PROCESSOR IMPLEMENTED SYSTEMS AND METHODS FOR OPTIMIZED VIDEO DECODING USING ADAPTIVE THREAD PRIORITY ADJUSTMENT

(75) Inventor: Xueming Zhao, Shanghai (CN)

(73) Assignee: Marvell International Ltd., Hamilton (BM)

( * ) Notice: Subject to any disclaimer, the term of this patent is extended or adjusted under 35 U.S.C. 154(b) by 505 days.

(21) Appl. No.: 13/422,554

(22) Filed: Mar. 16, 2012

Related U.S. Application Data (60) Provisional application No. 61/466,820, filed on Mar. 23, 2011.

(51) Int. Cl.
*H04B 1/66* (2006.01)
*G06T 1/20* (2006.01)
*H04N 11/04* (2006.01)
*G06T 11/20* (2006.01)

(52) U.S. Cl.
CPC *G06T 1/20* (2013.01); *G06T 11/206* (2013.01)
USPC .................................. 375/240.25; 348/419.1

(58) Field of Classification Search
CPC ........... G06T 1/20; G06T 15/005; G06T 1/60; G06T 5/002; G06T 11/206; G06T 3/08; G06T 3/04; G06K 9/00791; G06K 15/1803; G06K 15/402; G06K 9/00986; G06K 9/4628; H04B 1/00; H04B 1/10; H04N 21/4347; H04N 21/4383; H04N 21/44004; H04N 5/225; H04N 5/232; H04N 5/23245; H04N 5/2621; H04N 5/66; H04N 5/772; H04N 7/167
USPC ...................... 348/419.1; 375/240.01–240.29
See application file for complete search history.

(56) References Cited

U.S. PATENT DOCUMENTS

| | | | |
|---|---|---|---|
| 8,355,447 B2 * | 1/2013 | Zhao et al. ................ | 375/240.22 |
| 2006/0093331 A1 * | 5/2006 | Huang et al. .................... | 386/96 |
| 2006/0268994 A1 * | 11/2006 | Kwon et al. ............. | 375/240.26 |
| 2007/0011389 A1 * | 1/2007 | Nishikawa .................... | 710/309 |

* cited by examiner

*Primary Examiner* — Behrooz Senfi (57) ABSTRACT

Systems and methods are provided for operating a decoder to decode a video frame in a multi-threaded environment. A first buffer ring state is detected based on a status of a first buffer ring, and a second buffer ring state is detected based upon a status of a second buffer ring. An adjustment of priorities of a parser thread, a decoder thread, and a renderer thread is requested based on the first buffer ring state and the second buffer ring state. The first buffer ring is interacted with to receive stream data from the parser, the stream data is decoded to generate frame data, and the second buffer ring is interacted with to provide the frame data to the renderer for display.

18 Claims, 8 Drawing Sheets

| FIRST BUFFER RING | SECOND BUFFER RING | PRIORITY REQUEST | ADDITIONAL CRITERIA |
|---|---|---|---|
| FIRST IDLE > FIRST BUSY | SECOND IDLE > SECOND BUSY | PARSER > DECODER > RENDERER | |
| FIRST IDLE > FIRST BUSY | SECOND IDLE < SECOND BUSY | PARSER > RENDERER > DECODER | FIRST IDLE RATIO > SECOND BUSY RATIO |
| FIRST IDLE > FIRST BUSY | SECOND IDLE < SECOND BUSY | RENDERER > PARSER > DECODER | SECOND BUSY RATIO > FIRST IDLE RATIO |
| FIRST IDLE < FIRST BUSY | SECOND IDLE > SECOND BUSY | DECODER > RENDERER > PARSER | |
| FIRST IDLE < FIRST BUSY | SECOND IDLE < SECOND BUSY | RENDERER > DECODER > PARSER | |

| FIRST BUFFER RING | SECOND BUFFER RING | PRIORITY REQUEST | ADDITIONAL CRITERIA |
|---|---|---|---|
| FIRST IDLE > FIRST BUSY | SECOND IDLE > SECOND BUSY | PARSER > DECODER > RENDERER | |
| FIRST IDLE > FIRST BUSY | SECOND IDLE < SECOND BUSY | PARSER > RENDERER > DECODER | FIRST IDLE RATIO > SECOND BUSY RATIO |
| FIRST IDLE > FIRST BUSY | SECOND IDLE < SECOND BUSY | RENDERER > PARSER > DECODER | SECOND BUSY RATIO > FIRST IDLE RATIO |
| FIRST IDLE < FIRST BUSY | SECOND IDLE > SECOND BUSY | DECODER > RENDERER > PARSER | |
| FIRST IDLE < FIRST BUSY | SECOND IDLE < SECOND BUSY | RENDERER > DECODER > PARSER | |

PROCESSOR IMPLEMENTED SYSTEMS AND METHODS FOR OPTIMIZED VIDEO DECODING USING ADAPTIVE THREAD PRIORITY ADJUSTMENT

CROSS-REFERENCE TO RELATED APPLICATIONS

This application claims the benefit of U.S. Provisional Patent Application No. 61/466,820 filed on Mar. 23, 2011, the entire contents of which are incorporated herein by reference.

FIELD

The technology described herein relates generally to video processing, and more particularly to video decoder interaction with parsers and renderers.

BACKGROUND

Figure 1:
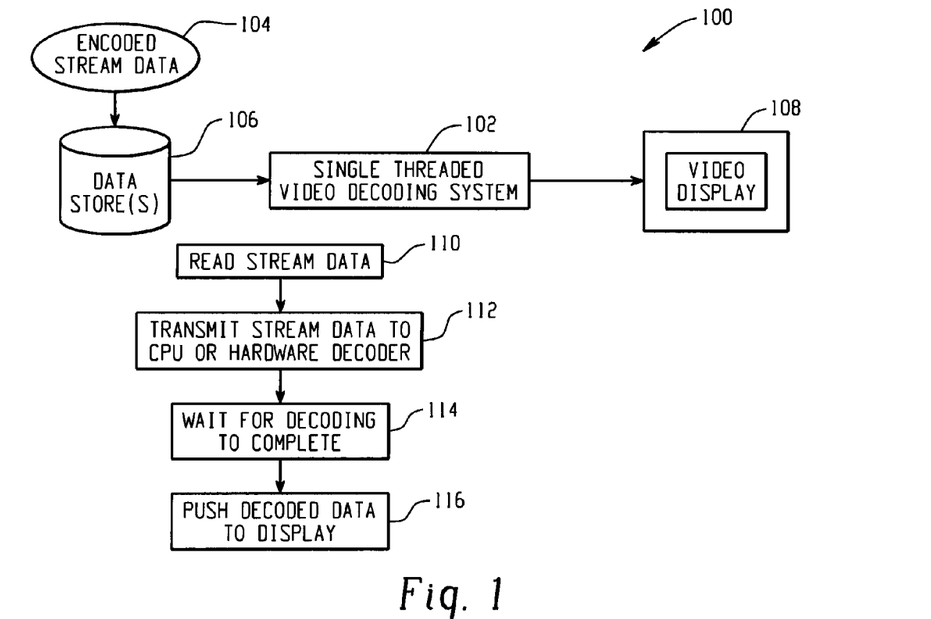
FIG. 1 is a block diagram depicting an example of a single threaded video decoding system.

Traditional video decoding schemes utilize a serial, single threaded approach to accessing an encoded video stream from disk, decoding the accessed stream, and providing the decoded stream for display. FIG. 1 is a block diagram depicting an example of a single threaded video decoding system. A single threaded video decoding system 102 parses (accesses) encoded video stream data 104 from one or more data stores 106. The single threaded video decoding system 102 decodes the accessed encoded stream data 104 and provides the decoded frames to a video display 108.

The traditional video decoding scheme utilizes a single processor, where the parsing of the encoded stream data, the decoding of the encoded stream data, and the rendering of the decoded frames are performed in series. The single processor reads the stream data 110, transmits the stream data to the CPU or a hardware decoder for processing 112, waits for decoding to complete if the decoding is performed using a hardware decoder 114, and pushes the decoded data to a display 116.

SUMMARY

Examples of systems and methods are provided for operating a decoder to decode a video frame in a multi-threaded environment where a parser thread is associated with a parser, a decoder thread is associated with the decoder, and a renderer thread is associated with a renderer, and where the parser thread communicates with the decoder thread using a first buffer ring, and the decoder thread communicates with the renderer thread using a second buffer ring. In one example, a first buffer ring state is detected based on a status of a first buffer ring, and a second buffer ring state is detected based upon a status of a second buffer ring. An adjustment of priorities of a parser thread, a decoder thread, and a renderer thread is requested based on the first buffer ring state and the second buffer ring state. The first buffer ring is interacted with to receive stream data from the parser, the stream data is decoded to generate frame data, and the second buffer ring is interacted with to provide the frame data to the renderer for display.

As another example, a system for operating a decoder to decode a video frame in a multi-threaded environment where a parser thread is associated with a parser, a decoder thread is associated with the decoder, and a renderer thread is associated with a renderer, and where the parser thread communicates with the decoder thread using a first buffer ring, and the decoder thread communicates with the renderer thread using a second buffer ring may include one or more data processors and one or more computer-readable storage mediums encoded with instructions for commanding the one or more data processors to execute a method. In the method, a first buffer ring state is detected based on a status of a first buffer ring, and a second buffer ring state is detected based upon a status of a second buffer ring. An adjustment of priorities of a parser thread, a decoder thread, and a renderer thread is requested based on the first buffer ring state and the second buffer ring state. The first buffer ring is interacted with to receive stream data from the parser, the stream data is decoded to generate frame data, and the second buffer ring is interacted with to provide the frame data to the renderer for display.

As a further example, a computer-readable storage medium may be encoded with instructions for commanding one or more data processors to execute steps for decoding a video frame in a multi-threaded environment where a parser thread is associated with a parser, a decoder thread is associated with the decoder, and a renderer thread is associated with a renderer, and where the parser thread communicates with the decoder thread using a first buffer ring and the decoder thread communicates with the renderer thread using a second buffer ring. The steps may include detecting a first buffer ring state based on a status of a first buffer ring, and detecting a second buffer ring state based upon a status of a second buffer ring. An adjustment of priorities of a parser thread, a decoder thread, and a renderer thread is requested based on the first buffer ring state and the second buffer ring state. The first buffer ring is interacted with to receive stream data from the parser, the stream data is decoded to generate frame data, and the second buffer ring is interacted with to provide the frame data to the renderer for display.

DETAILED DESCRIPTION

Figure 2:
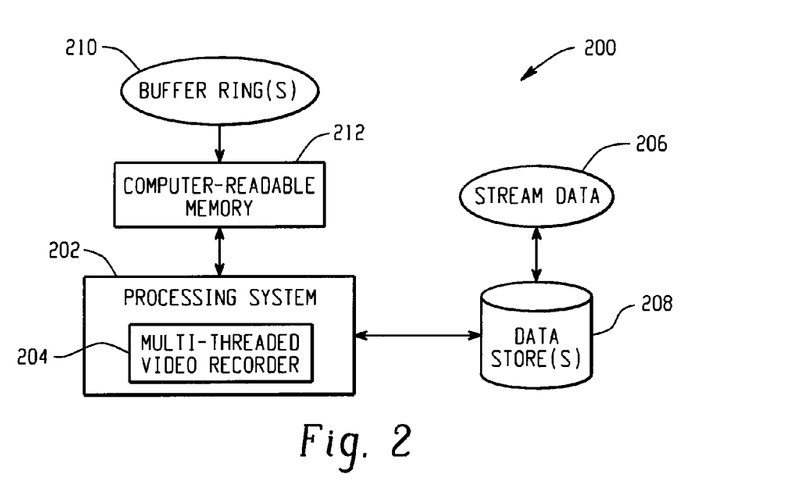
FIG. 2 is a block diagram depicting an example of a multi-threaded video decoder system.

FIG. 2 is a block diagram depicting an example of a multi-threaded video decoder system. A processing system 202 includes one or more central processing units for executing a multi-threaded video decoder 204. The multi-threaded video decoder 204 accesses stream data stored in one or more data stores 208 and prepares the stream data 206 for viewing. For example, the multi-threaded video decoder 204 may utilize a parser that is associated with a parser thread for accessing the stream data, a decoder that is associated with a decoder thread to decode the stream data to generate frame data, and a renderer associated with a renderer thread to render the decoded frame data. The multi-threaded video decoder 204 may utilize one or more buffer rings 210 via computer-readable memory 212 to facilitate communications among the parser thread, the decoder thread, and the renderer thread.

Figure 3:
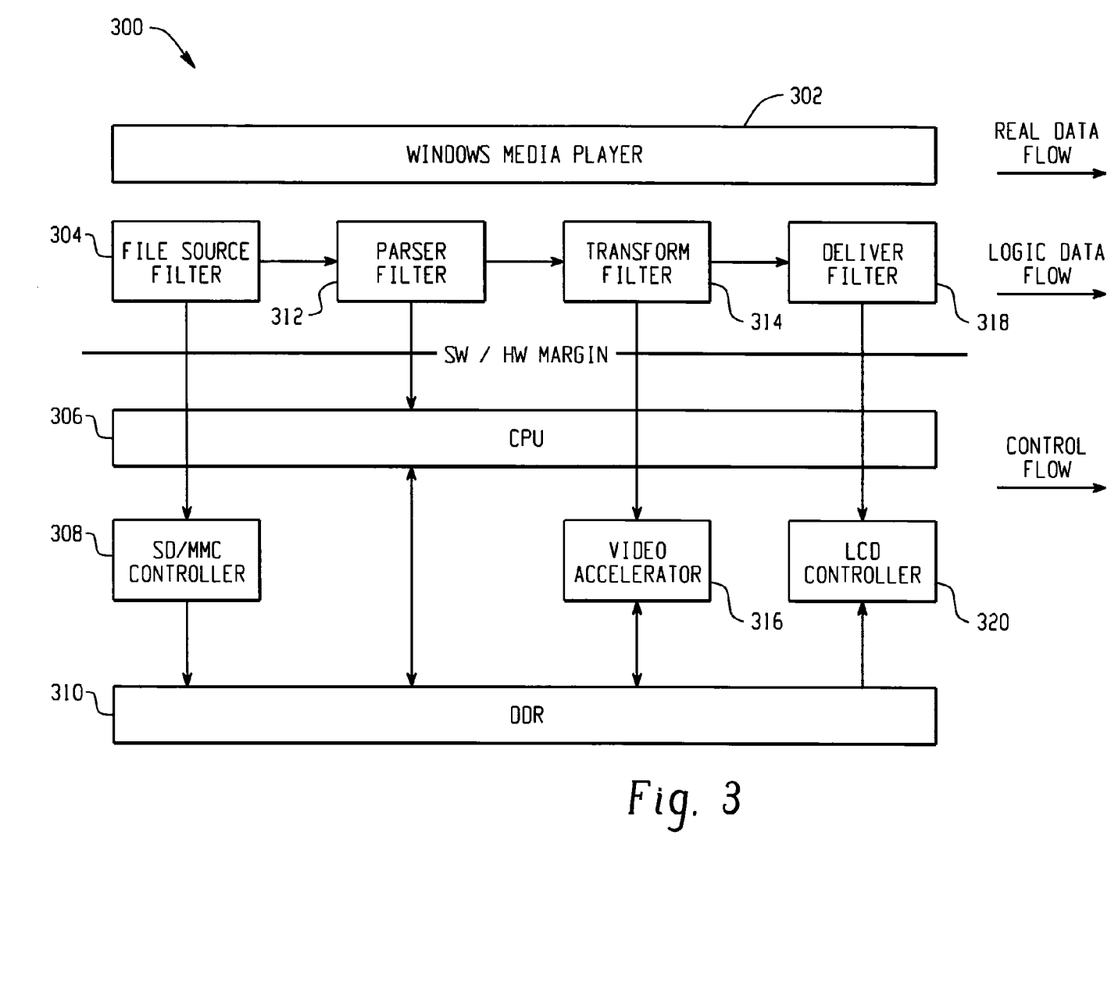
FIG. 3 is a block diagram depicting an example of a physical and logical layout for a multi-threaded video decoder.

FIG. 3 is a block diagram depicting an example of a physical and logical layout for a multi-threaded video decoder. A decoding process may be managed using an application 302 such as Windows™ Media Player. The application 302 may provide interfaces for selection of video to display, to control of playback of the display, and to display the selected video. Logically, data, such as a video stream, flows from a file source 304, which may interact with hardware such as a CPU 306, an SD/MMC controller 308, and a DDR memory 310. The stream data is accessed from a data store and provided to a parser 312. The parser 312 processes the stream data and provides the stream data to a decoder 314 for transformation to generate frame data. The decoder may access a video hardware accelerator 316 to offload certain of the transformation operations from the CPU 306 and to improve speed of the video decoding process. The frame data is rendered and delivered at 318. For example, the rendering and delivering phase may provide the frame data to an LCD controller 320 for display to a user via the application 302.

Figure 4:
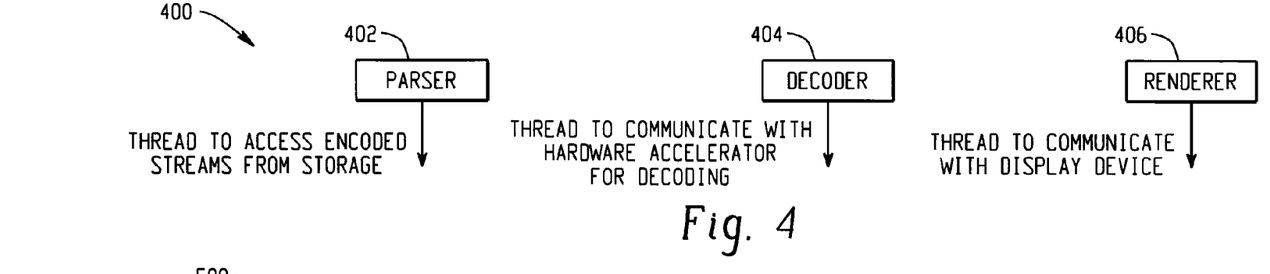
FIG. 4 is a block diagram depicting example components for decoding a video frame in a multi-threaded environment.

FIG. 4 is a block diagram depicting example components for decoding a video frame in a multi-threaded environment. A parser 402 accesses one or more encoded video streams from storage using a parser thread. A decoder uses a decoder thread to communicate with a hardware accelerator for decoding the accessed encoded video streams to generate video frame data. A renderer 406 uses a renderer thread to communicate with a display device to display the decoded video frame data.

Figure 5:
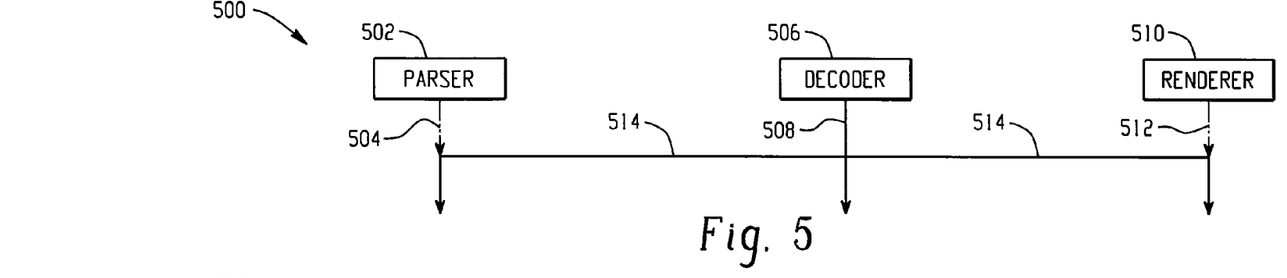
FIG. 5 is a block diagram depicting a decoder that is associated with a parser thread, a decoder thread, and a renderer thread.

FIG. 5 is a block diagram depicting a decoder that is associated with each of a parser thread, a decoder thread, and a renderer thread. In the example of FIG. 4, each of the parser, the decoder, and the renderer operate in separate threads in a multi-threaded environment, offering certain advantages and efficiencies over a single-threaded architecture. However, additional synergy may be achieved when the threads are able to communicate with one another. For example, the communicating threads may be able to dynamically set operating system priorities for themselves based on their current states of operation. In such a configuration, more processing resources (e.g., time and processing units) may be allocated to bottleneck threads, where the bottlenecks are dynamically determined during operation. In the example of FIG. 5, a parser 502 is associated with a parser thread 504 for accessing video stream data from a data store. A decoder 506 is associated with a decoder thread 508 for receiving the accessed video stream data and decoding the video stream data to generate frame data. A renderer 510 is associated with a renderer thread 512 for receiving the decoded frame data and providing the frame data to a display device. As indicated at 514, the decoder thread 508 is also in communication with the parser thread 504 and the renderer thread 512 to dynamically manage the decoding process.

For example, the parser thread 504 may be initiated upon a user request to view a video. The parser thread 504 may call the decoder thread 508 to begin a decoding operation. The decoder thread may call the renderer thread 512 for providing decoded frame data to a video display. The decoder thread 508 may maintain contact with the parser thread 504 and the renderer thread 512 to manage the decoding process, as described below in further detail.

Figure 6:
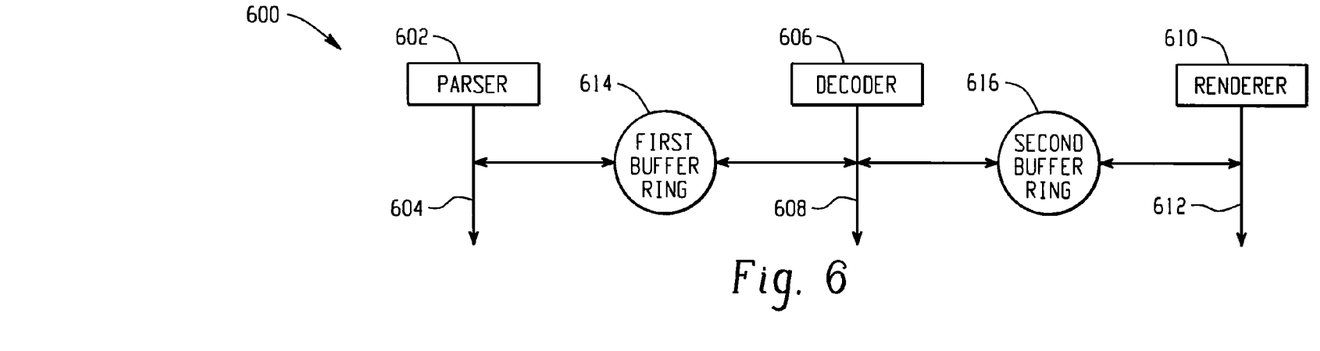
FIG. 6 is a block diagram depicting communication among a parser thread, a decoder thread, and a renderer thread using buffer rings.

FIG. 6 is a block diagram depicting communication among a parser thread, a decoder thread, and a renderer thread using buffer rings. A parser 602 is associated with a parser thread 604 for accessing video stream data from a data store, a decoder 606 is associated with a decoder thread 608 for processing the accessed video stream data to generate frame data, and a renderer 610 is associated with a renderer thread 612 for providing the frame data to a display. The decoder 606 is associated with each of the parser thread 604, the decoder thread 608, and the renderer thread 612 to monitor and manage communications among the threads 604, 608, 612. In the example of FIG. 6, a first buffer ring 614 facilitates communications between the parser thread 604 and the decoder thread 608, and a second buffer ring 616 facilitates communications between the decoder thread 608 and the renderer thread 612.

Figure 7:
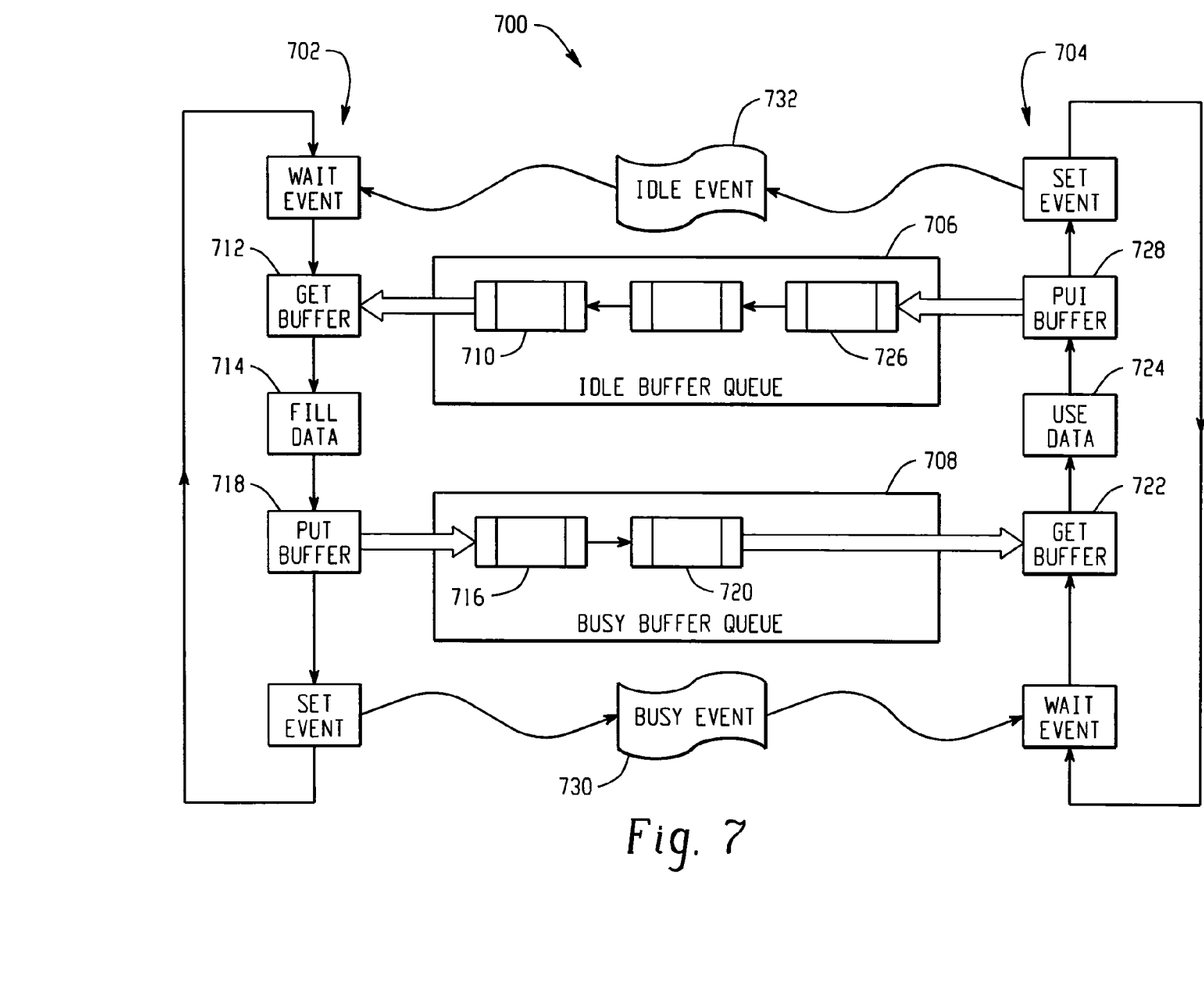
FIG. 7 depicts an example of a buffer ring that utilizes one or more linked lists to facilitate communications between two entities (e.g., a parser, a decoder, a renderer) in a video decoding operation.

Buffer rings may take a variety of forms. For example, FIG. 7 depicts an example of a buffer ring that utilizes one or more linked lists to facilitate communications between two entities (e.g., a parser and a decoder, a decoder and a renderer) in a video decoding operation. For example, the left portion 702 of the buffer ring may be utilized by a parser to send video stream data to a decoder, and the right portion 704 of the buffer ring may be utilized by the decoder to return idle buffers to the parser. In another example, the left portion 702 of the buffer ring may be utilized by the decoder to send frame data to a renderer, and the right portion 704 of the buffer ring may be utilized by the renderer to return idle buffers to the decoder. In an initial state, the idle buffer queue 706 may contain a number of buffers (e.g., a data structure containing a data field and a pointer to another buffer). The busy buffer queue 708 may initially be empty.

In one operational scenario where a parser operates the left sequence 702 and a decoder operates the right sequence 704, the parser accesses video stream data from a data store (e.g., one frame worth of stream data, part of a frame worth of stream data, multiple frames worth of stream data) and accesses a buffer 710 from the front of the idle buffer queue 706 at 712. At 714, the parser populates the accessed buffer with accessed video stream data and places the buffer at the end 716 of the busy buffer queue 708 at 718. When the decoder has processing resources available, the decoder accesses the buffer at the front 720 of the busy buffer queue at 722. The decoder decodes the video stream data from the accessed buffer 720 at 724 and returns the empty buffer to the end 726 of the idle buffer queue 706 at 728. The parser thread and the decoder thread may also transmit event data 730, 732 to identify the status of their operation. For example, the parser may send busy event data 730 to the decoder each time the parser places the buffer at the end 716 of the busy buffer queue 708. Receipt of the busy event data 730 by the decoder thread may act as a wake up signal to the decoder thread when the decoder thread is in a wait state. However, when not in a wait state, the decoder thread may continue to access and decode data from the busy buffer queue 708 as long as long as populated buffers remain in the busy buffer queue 708. The decoder thread may function in a similar way using the idle event signal 732, where the idle event signal may be sent to the parser thread each time that the decoder thread returns an empty buffer to the end 726 of the idle buffer queue 706, where such a signal can act as a wake up signal for the parser queue when the parser thread is in a wait state.

In another operational scenario where a decoder operates the left sequence 702 and a renderer operates the right sequence 704, the decoder decodes video stream and accesses a buffer 710 from the front of the idle buffer queue 706 at 712. At 714, the decoder populates the accessed buffer with decoded frame data and places the buffer at the end 716 of the busy buffer queue 708 at 718. When the renderer has processing resources available, the renderer accesses the buffer at the front 720 of the busy buffer queue at 722. The renderer processes the frame data from the accessed buffer 720 at 724 and returns the empty buffer to the end 726 of the idle buffer queue 706 at 728.

The decoder thread and the renderer thread may also transmit event data 730, 732 to identify the status of their operation. For example, the decoder may send busy event data 730 to the renderer each time the decoder places the buffer at the end 716 of the busy buffer queue 708. Receipt of the busy event data 730 by the renderer thread may act as a wake up signal to the renderer thread when the renderer thread is in a wait state. However, when not in a wait state, the renderer thread may continue to access and decode data from the busy buffer queue 708 as long as long as populated buffers remain in the busy buffer queue 708. The renderer thread may function in a similar way using the idle event signal 732, where the idle event signal may be sent to the decoder thread each time that the renderer thread returns an empty buffer to the end 726 of the idle buffer queue 706, where such a signal can act as a wake up signal for the decoder queue when the decoder thread is in a wait state.

The decoder keeps tracks of the states of the first buffer ring that facilitates communications between the parser and the decoder and the second buffer ring that facilitates communications between the decoder and the renderer. Based on the detected states of the first and second buffer rings, the decoder may set operating system thread priorities for the associated threads (e.g., the parser, the decoder, and the renderer threads). A thread operating at a first priority may be provided more processing resources (e.g., more processor computation cycles) than a thread having a lower operating system priority. Thus, it may be beneficial to apply a high operating system priority to bottleneck threads (e.g., threads whose processing is backed up based on slow processing speed or being overwhelmed with data).

Figure 8:
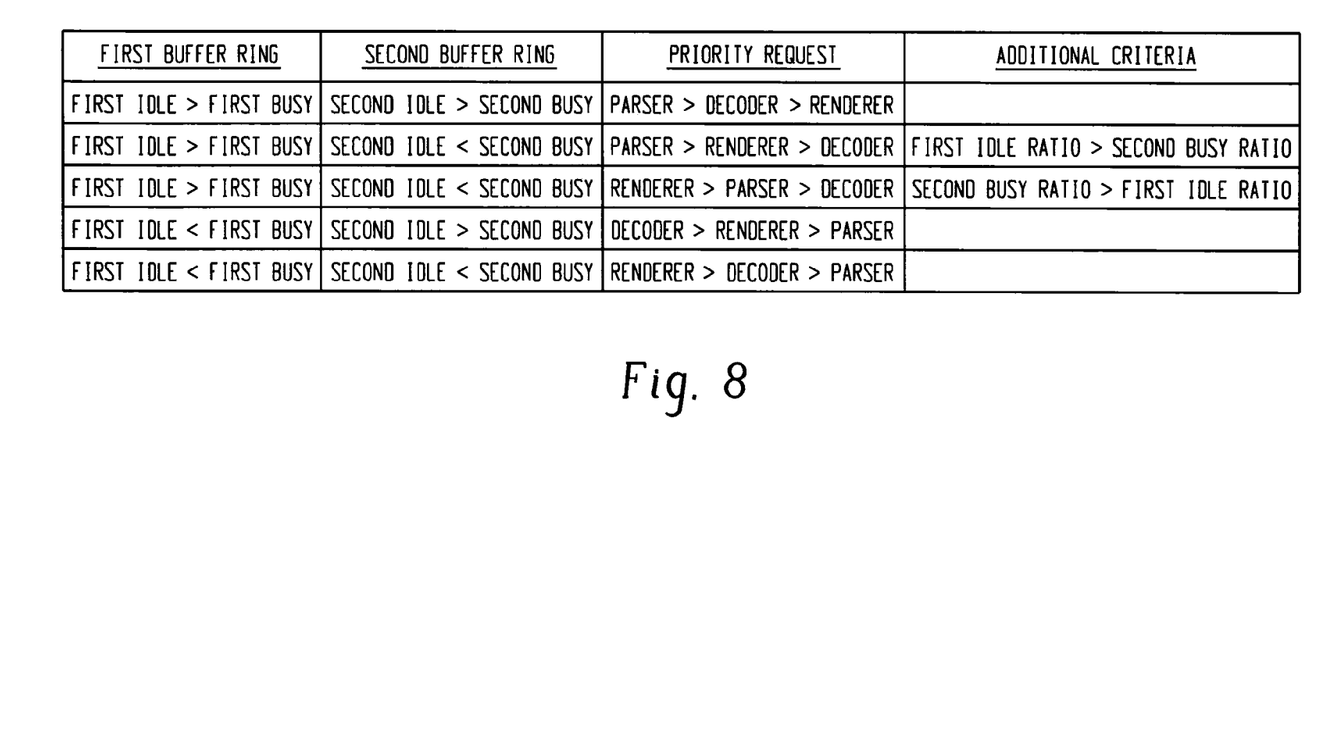
FIG. 8 is a chart depicting example priorities that can be set based upon statuses of the first buffer ring and the second buffer ring.

FIG. 8 is a chart depicting example priorities that can be set based upon statuses of the first buffer ring and the second buffer ring. In the first row in a first scenario, where the idle queue for the first buffer ring contains more buffers than the busy queue for the first buffer ring, and the idle queue for the second buffer ring contains more buffers than the busy queue for the second buffer ring, then the parser thread is set to a first priority level, the decoder thread is set to a second priority level that is lower than the second priority level, and the renderer is set to a third priority level that is lower than the second priority level. These priority levels are set because the parser thread is busier than the decoder thread, and the decoder thread is busier than the renderer thread.

In the scenario of the second row, the idle queue for the first buffer ring contains more buffers than the busy queue for the first buffer ring, and the idle queue for the second buffer ring contains fewer buffers than the busy queue for the second buffer ring. Additionally, the ratio of idle buffers in the first buffer ring to total buffers in the first buffer ring is greater than the ratio of busy buffers in the second buffer ring to total buffers in the second buffer ring (e.g., "first idle>second busy" when the first buffer ring and the second buffer ring have an equal number of buffers and "first idle/number of buffers in first ring>second busy/number of buffers in second ring" otherwise). In this scenario, the parser thread is set to a first priority level, the renderer thread is set to a second priority level that is lower than the second priority level, and the decoder is set to a third priority level that is lower than the second priority level.

In the scenario of the third row, the idle queue for the first buffer ring contains more buffers than the busy queue for the first buffer ring, and the idle queue for the second buffer ring contains fewer buffers than the busy queue for the second buffer ring. Additionally, the ratio of busy buffers in the second buffer ring to total buffers in the second buffer ring is greater than the ratio of idle buffers in the first buffer ring to total buffers in the first buffer ring (e.g., "second busy>first idle" when the first buffer ring and the second buffer ring have an equal number of buffers and "second busy/number of buffers in second ring>first idle/number of buffers in first ring" otherwise). In this scenario, the renderer thread is set to a first priority level, the parser thread is set to a second priority level that is lower than the second priority level, and the decoder thread is set to a third priority level that is lower than the second priority level.

In the scenario of the fourth row, the idle queue for the first buffer ring contains fewer buffers than the busy queue for the first buffer ring, and the idle queue for the second buffer ring contains more buffers than the busy queue for the second buffer ring. In this scenario, the decoder thread is set to a first priority level, the renderer thread is set to a second priority level that is lower than the second priority level, and the parser is set to a third priority level that is lower than the second priority level.

In the scenario of the fifth row, the idle queue for the first buffer ring contains fewer buffers than the busy queue for the first buffer ring, and the idle queue for the second buffer ring contains fewer buffers than the busy queue for the second buffer ring. In this scenario, the renderer thread is set to a first priority level, the decoder thread is set to a second priority level that is lower than the second priority level, and the parser is set to a third priority level that is lower than the second priority level.

In some implementations, a thread may be able to request that additional buffers be allocated in a buffer ring to facilitate continued operation when a buffer queue is empty. For example, when the idle queue for the first buffer ring is empty, then the parser is unable to provide accessed video stream data to the busy queue for the decoder to process. To avoid wasting processing cycles being in an idle state, the parser thread may request that the first buffer ring, and specifically the first buffer ring idle queue, be allocated another buffer for the parser to fill.

To limit buffer rings from becoming too big or too small in size, minimum buffer ring sizes (low water marks) and maximum buffer ring sizes (high water marks) may be established. For example, a buffer ring may have a low water mark set based on a number of P or B frames between I frames in a video stream, where I frames contain data for all pixels in a video frame, while P and B frames only contain data for pixels that have changed from one frame to the next. Because certain processing may refer to an I frame (e.g., calculating pixel values for P or B frames which only contain pixel delta values), the low water mark may be set to ensure that at least one I frame is accessible at all times. In situations where one thread is a consistent bottleneck, a high water mark may be set to avoid a scenario where the companion thread of the bottleneck thread requests a large number of buffers because the companion thread's queue is often empty.

Figure 9:
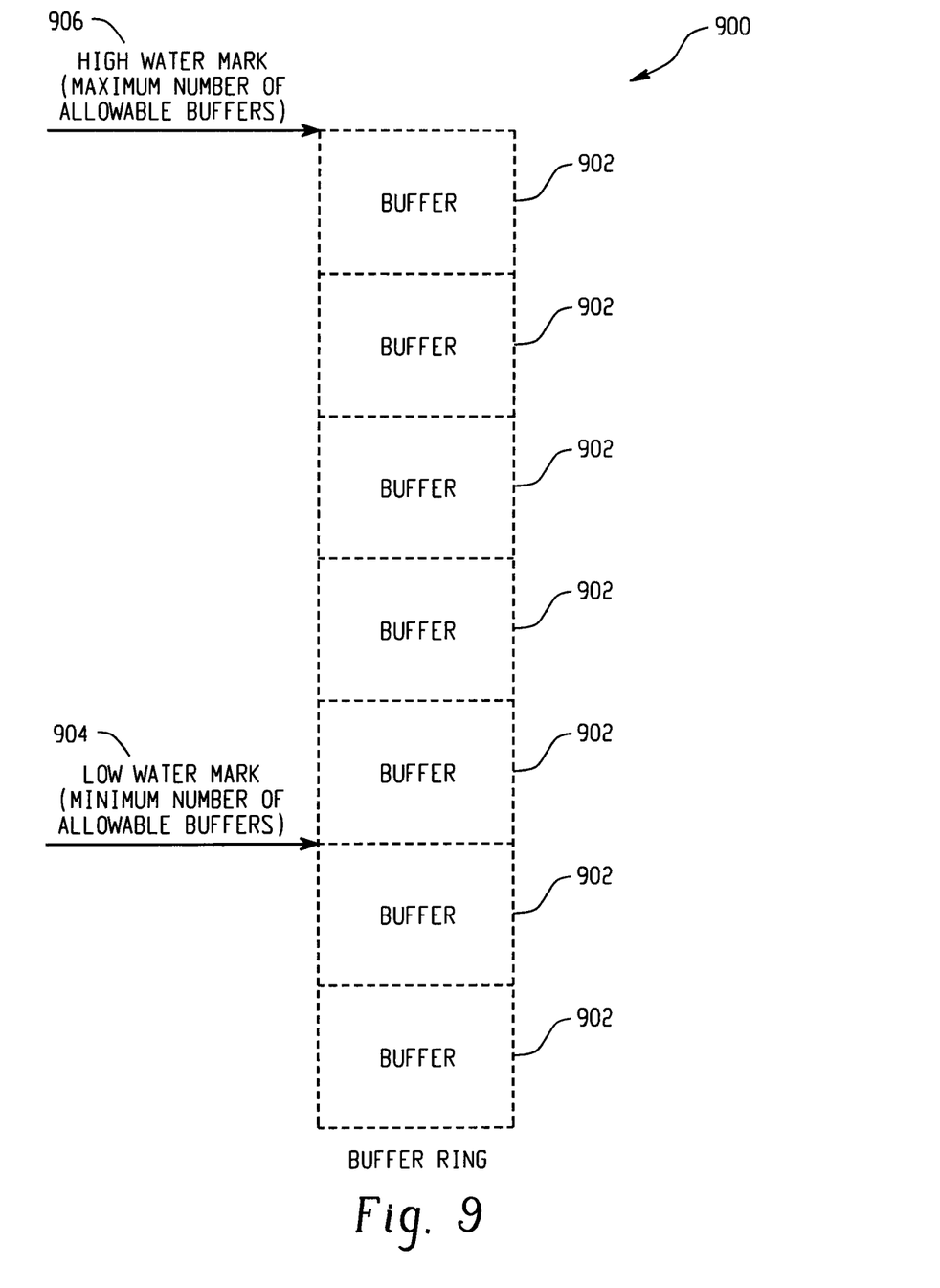
FIG. 9 depicts a number of buffers of an idle queue and a busy queue for a buffer ring.

FIG. 9 depicts a number of buffers of an idle queue and a busy queue for a buffer ring. The lower water mark 904 identifies the lowest number of buffers that must be maintained, and the high water mark 906 identifies a maximum number of buffers permitted in a buffer ring. When the number of buffers in the buffer ring is at the low water mark 904, requests for additional buffers may always or often be granted. When the number of buffers in the buffer ring is at the high water mark 906, requests for additional buffers may always or often be refused.

Figure 10A:
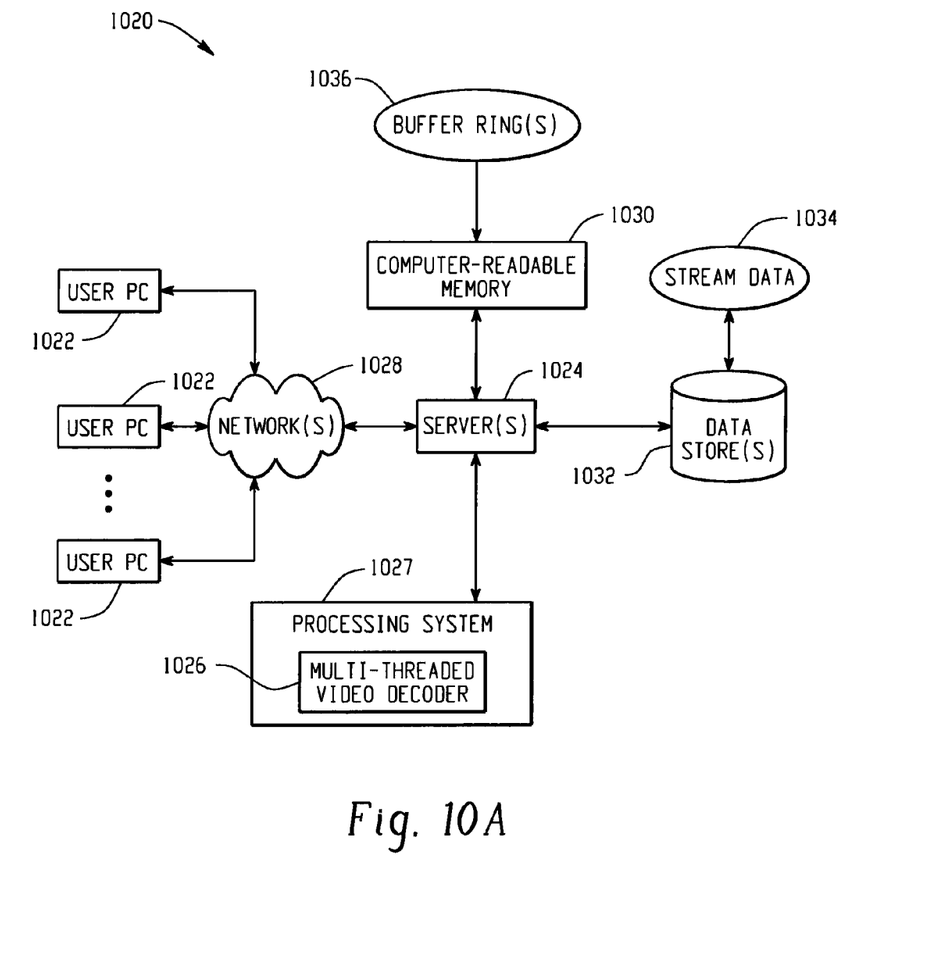
FIGS. 10A and 10B depict examples of systems for use in implementing a multi-threaded video decoder.

FIGS. 10A and 10B depict examples of systems for use in implementing a multi-threaded video decoder. For example, FIG. 10A depicts a system 1020 that includes a client server architecture. One or more user PCs 1022 access one or more servers 1024 running multi-threaded video decoding application 1026 on a processing system 1027 via one or more networks 1028. The one or more servers 1024 may access a computer readable memory 1030 holding one or more buffer rings 1036 as well as one or more data stores 1032. The one or more data stores 1032 may contain video stream data 1034.

Figure 10B:
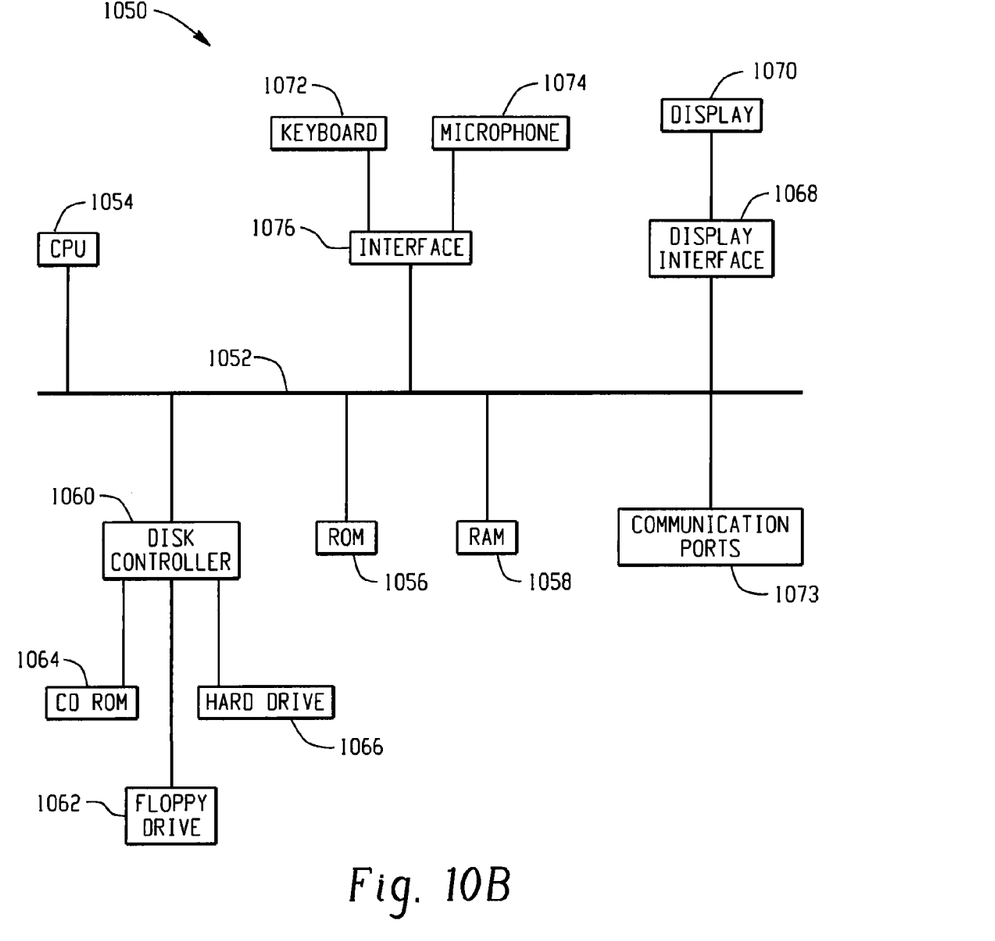

FIG. 10B shows a block diagram of an example of hardware for a standalone computer architecture 1050, such as the architecture depicted in FIG. 2 that may be used to contain and/or implement the program instructions of system embodiments of the present invention. A bus 1052 may connect the other illustrated components of the hardware. A processing system 1054 labeled CPU (central processing unit) (e.g., one or more computer processors), may perform calculations and logic operations required to execute a program. A processor-readable storage medium, such as read only memory (ROM) 1056 and random access memory (RAM) 1058, may be in communication with the processing system 1054 and may contain one or more programming instructions for performing the method of implementing a multi-threaded video decoding application. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1060 interfaces one or more optional disk drives to the system bus 1052. These disk drives may be external or internal floppy disk drives such as 1062, external or internal CD-ROM, CD-R, CD-RW or DVD drives such as 1064, or external or internal hard drives 1066. As indicated previously, these various disk drives and disk controllers are optional devices.

A display interface 1068 may permit information from the bus 1052 to be displayed on a display 1070 in audio, graphic, or alphanumeric format. Communication with external devices may optionally occur using various communication ports 1073.

In addition to the standard computer-type components, the hardware may also include data input devices, such as a keyboard 1072, or other input device 1074, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of operating a decoder to decode a video frame in a multi-threaded environment where a parser thread is associated with a parser, a decoder thread is associated with the decoder, and a renderer thread is associated with a renderer, and where the parser thread communicates with the decoder thread using a first buffer ring and the decoder thread communicates with the renderer thread using a second buffer ring, wherein the first buffer ring includes a first free buffer queue and a first busy buffer queue, and wherein the second buffer ring includes a second free buffer queue and a second busy buffer queue, the method comprising:

detecting a first buffer ring state defining which queue of the first free buffer queue and the first busy buffer queue has more buffers;

detecting a second buffer ring state defining which queue of the second free buffer queue and the second busy buffer queue has more buffers;

determining, based on the first buffer ring state and the second buffer ring state, an order of priority for the parser thread, the decoder thread, and the renderer thread;

interacting with the first buffer ring to receive stream data from the parser;

decoding the stream data to generate frame data; and interacting with the second buffer ring to provide the frame data to the renderer for display.

2. The method of claim 1, wherein:
- a high priority is requested for the parser thread, a medium priority is requested for the decoder thread, and a low priority is requested for the renderer thread when i) the first free buffer queue has more buffers than the first busy buffer queue and ii) the second free buffer queue has more buffers than the second busy buffer queue;
- a high priority is requested for the decoder thread, a medium priority is requested for the renderer thread, and a low priority is requested for the parser thread when i) the first free buffer queue has fewer buffers than the first busy buffer queue and ii) the second free buffer queue has more buffers than the second busy buffer queue; and
- a high priority is requested for the renderer thread, a medium priority is requested for the decoder thread, and a low priority is requested for the parser thread when i) the first free buffer queue has fewer buffers than the first busy buffer queue and ii) the second free buffer queue has fewer buffers than the second busy buffer queue.

3. The method of claim 1, wherein:
- a high priority is requested for the parser thread, a medium priority is requested for the renderer thread, and a low priority is requested for the decoder thread when i) the first free buffer queue has more buffers than the first busy buffer queue, ii) the second free buffer queue has fewer buffers than the second busy buffer queue, and iii) the second busy buffer queue is full; and
- a high priority is requested for the renderer thread, a medium priority is requested for the parser thread, and a low priority is requested for the decoder thread when i) the first free buffer queue has more buffers than the first busy buffer queue, ii) the second free buffer queue has fewer buffers than the second busy buffer queue, and iii) the second busy buffer queue is empty.

4. The method of claim 1, wherein the parser accesses a buffer from the first free buffer queue, populates the buffer with the stream data, and moves the buffer to the first busy buffer queue;
wherein the decoder accesses the buffer from the first busy buffer queue, retrieves the stream data from the buffer, and returns the buffer to the first free buffer queue.

5. The method of claim 1, wherein:
- the decoder accesses a buffer from the second free buffer queue, populates the buffer with the frame data, and moves the buffer to second busy buffer queue; and
- the renderer accesses the buffer from the second busy buffer queue, retrieves the frame data from the buffer, and returns the buffer to the second free buffer queue.

6. The method of claim 1, wherein the parser reads stream data from a data store, and wherein the renderer provides the frame data to a video display device.

7. The method of claim 1, wherein the decoder interacts with a video hardware accelerator to decode the stream data to generate the frame data.

8. The method of claim 1, wherein the decoder is associated with each of the parser thread, the decoder thread, and the renderer thread.

9. The method of claim 8, wherein the parser thread, the decoder thread, and the renderer thread communicate with one another via the association of the decoder to the parser thread, the decoder thread, and the renderer thread.

10. The method of claim 1, wherein the parser thread sends a signal to the decoder thread to wake the decoder thread when the first free buffer queue is empty.

11. The method of claim 1, wherein the decoder thread sends a signal to the parser thread to wake the parser thread when the first busy buffer queue is empty.

12. The method of claim 1, wherein the decoder requests a buffer be added to the second buffer ring when the second free buffer queue is empty.

13. The method of claim 12, wherein the add buffer request is always granted when the second buffer ring contains a minimum number of allowable buffers.

14. The method of claim 13, wherein the minimum number of allowable buffers is set based on a number of frames between I-frames.

15. The method of claim 12, wherein the add buffer request is never granted when the second buffer ring contains a maximum number of allowable buffers.

16. The method of claim 1, wherein at initiation, the first busy buffer queue and the second busy buffer queue are empty.

17. One or more computer-readable storage mediums encoded with instructions for commanding one or more data processors to execute a method for operating a decoder to decode a video frame in a multi-threaded environment where a parser thread is associated with a parser, a decoder thread is associated with the decoder, and a renderer thread is associated with a renderer, and where the parser thread communicates with the decoder thread using a first buffer ring and the decoder thread communicates with the renderer thread using a second buffer ring, wherein the first buffer ring includes a first free buffer queue and a first busy buffer queue, and wherein the second buffer ring includes a second free buffer queue and a second busy buffer queue, the method comprising:
- detecting a first buffer ring state defining which queue of the first free buffer queue and the first busy buffer queue has more buffers;
- detecting a second buffer ring state defining which queue of the second free buffer queue and the second busy buffer queue has more buffers;
- determining, based on the first buffer ring state and the second buffer ring state, an order of priority for the parser thread, the decoder thread, and the renderer thread;
- interacting with the first buffer ring to receive stream data from the parser;
- decoding the stream data to generate frame data; and
- interacting with the second buffer ring to provide the frame data to the renderer for display.

18. A computer-implemented system for operating a decoder to decode a video frame in a multi-threaded environment where a parser thread is associated with a parser, a decoder thread is associated with the decoder, and a renderer thread is associated with a renderer, and where the parser thread communicates with the decoder thread using a first buffer ring and the decoder thread communicates with the renderer thread using a second buffer ring, wherein the first buffer ring includes a first free buffer queue and a first busy buffer queue, and wherein the second buffer ring includes a second free buffer queue and a second busy buffer queue, the system comprising:
- one or more data processors;
- one or more computer-readable storage mediums containing instructions for commanding the one or more data processors to execute a method that includes:
  - detecting a first buffer ring state defining which queue of the first free buffer queue and the first busy buffer queue has more buffers;
  - detecting a second buffer ring state defining which queue of the second free buffer queue and the second busy buffer queue has more buffers;

determining, based on the first buffer ring state and the second buffer ring state, an order of priority for the parser thread, the decoder thread, and the renderer thread;
interacting with the first buffer ring to receive stream data from the parser;
decoding the stream data to generate frame data; and
interacting with the second buffer ring to provide the frame data to the renderer for display.

* * * * *